(12) United States Patent
Huff et al.

(10) Patent No.: US 12,326,593 B1
(45) Date of Patent: Jun. 10, 2025

(54) TECHNIQUES FOR SINGULATING PHOTONICS DIE WITH OPTICAL QUALITY EDGE

(71) Applicant: AEVA, INC., Mountain View, CA (US)

(72) Inventors: Brett E. Huff, Keller, TX (US); Pradeep Srinivasan, Fremont, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 18/424,201

(22) Filed: Jan. 26, 2024

(51) Int. Cl.
| | |
|---|---|
| *G02B 6/122* | (2006.01) |
| *G01S 7/481* | (2006.01) |
| *G01S 17/58* | (2006.01) |
| *G01S 17/931* | (2020.01) |
| *G02B 6/136* | (2006.01) |
| *G02B 6/12* | (2006.01) |

(52) U.S. Cl.
CPC ............ *G02B 6/136* (2013.01); *G01S 7/4817* (2013.01); *G01S 17/58* (2013.01); *G01S 17/931* (2020.01); *G02B 2006/12061* (2013.01)

(58) Field of Classification Search
CPC .................................................... G02B 6/1225
See application file for complete search history.

(56) References Cited

U.S. PATENT DOCUMENTS

| | | | |
|---|---|---|---|
| 2009/0197394 A1* | 8/2009 | Parekh ..................... | H01L 21/78 257/E21.001 |
| 2014/0269800 A1* | 9/2014 | Purnawirman .......... | H01S 3/17 359/344 |
| 2024/0096634 A1* | 3/2024 | Ji ............................. | H01L 21/78 |

* cited by examiner

*Primary Examiner* — Christopher A Johnson
(74) *Attorney, Agent, or Firm* — Womble Bond Dickinson (US) LLP

(57) ABSTRACT

A method of singulating a die of a wafer includes etching a trench on a first surface of a wafer comprising a die and performing a cut on a second surface of the wafer, wherein the cut overlaps with the trench on the first surface of the wafer to separate the die from the wafer.

7 Claims, 7 Drawing Sheets

TECHNIQUES FOR SINGULATING PHOTONICS DIE WITH OPTICAL QUALITY EDGE

FIELD

The present disclosure is related to LIDAR (light detection and ranging) systems in general, and more particularly to singulating a photonics die with optical quality edges.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. Multiple photonics dies used in such LIDAR systems can be manufactured on a single silicon wafer. The dies are then separated to be incorporated into a LIDAR system.

SUMMARY

The present disclosure describes examples of a system and method for singulating or separating photonics die fabricated on a wafer using a combination of etching techniques and cutting techniques.

In some embodiments, a method of die singulation, includes etching a trench on a first surface of a wafer comprising a die and performing a cut on a second surface of the wafer, wherein the cut overlaps with the trench on the first surface of the wafer to separate the die from the wafer.

In some embodiments, the first surface is a front side of the wafer on which the die is disposed and the second surface is a back side of the wafer. In some embodiments, the etch on the front side of the wafer includes a deep oxide etch. In some embodiments, the cut on the second surface of the wafer is a dicing cut performed with a cutting blade. In some embodiments, the cut on the second surface is wider than the trench on the first surface. In some embodiments, the trench on the first surface extends through the die into bulk silicon wafer.

In some embodiments, the method further includes performing one or more reference cuts on the first surface of the wafer and aligning the cut on the second surface of the wafer using the one or more reference cuts. In some embodiments, the overlap of the cut and the trench is between 30-60 percent of a depth of the etched trench. In some embodiments, the method includes imaging the first surface of the wafer from the second surface of the wafer and aligning the cut on the second surface of the wafer based on the imaging from the second surface of the wafer. In some embodiments, the die is a photonics die with edge emitting and edge receiving waveguides.

In one embodiment, a system for singulating a die on a wafer includes a wafer comprising at least one die; an etching component to etch a trench on a first surface of the wafer; and a cutting component to perform a cut on a second surface of the wafer, wherein the cut overlaps with the trench on the first surface of the wafer to separate the die from the wafer.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Figure 1:
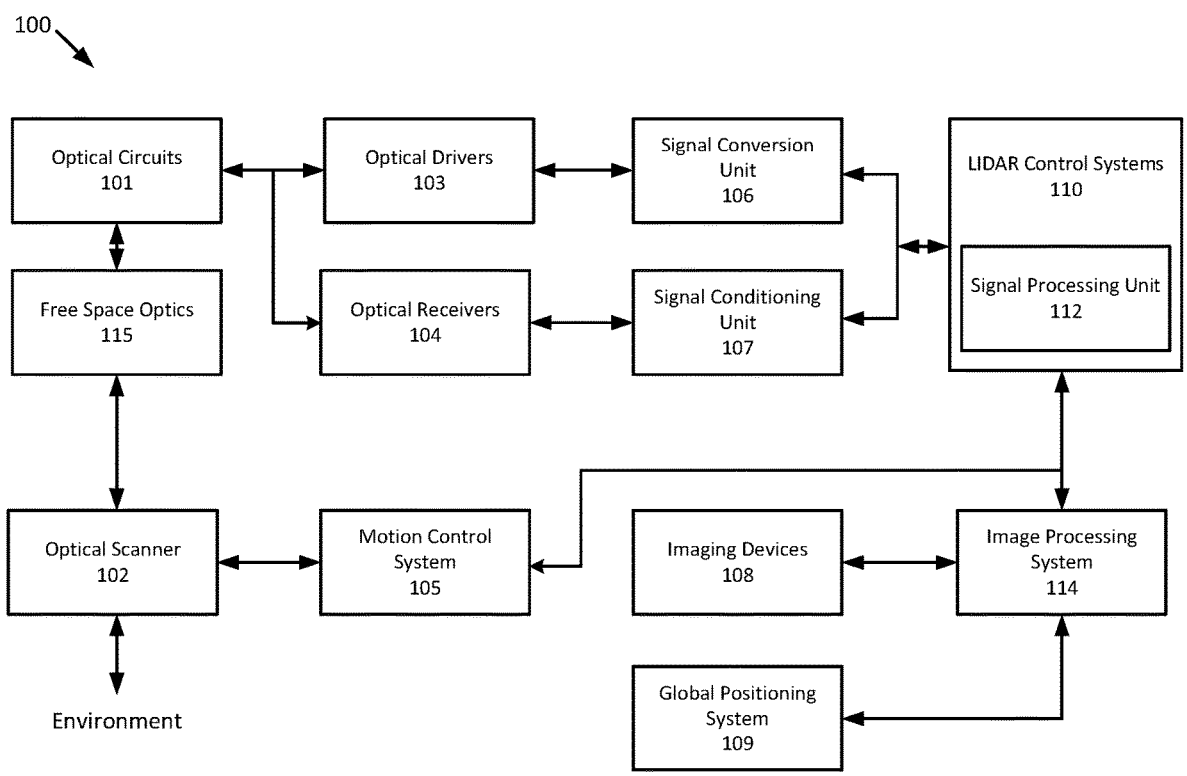
FIG. 1 is a block diagram illustrating an example LIDAR system according to embodiments of the present disclosure.

The present disclosure describes various examples of singulating dies (e.g., for a LIDAR system) from a wafer using a combination of etching and mechanical cutting. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

Photonics chips that are incorporated into a LIDAR system may be manufactured from a silicon wafer. For example, several photonics chips, also referred to as dies, may be produced from a single silicon wafer. The construction of the photonics dies on the wafer may be performed by any known die production techniques, such as etching, printing, etc. Once the photonics dies have been constructed, the dies are separated (also referred to herein as "singulated") into individual dies (e.g., chips). Various conventional techniques may be used to singulate the dies of a wafer. For example, one traditional method of singulating dies include scribing between the dies and separating the dies by snapping the small amount of material remaining between the dies. This method is low cost but does not provide for an optical quality edge which may be necessary for edge coupled photonics. In another example, the dies may be separated using mechanical dicing where a line is scribed around the die and then cut through with a saw. This process is also low cost but does not produce optical quality edges for the die. While polishing of the edges may be performed to obtain optical quality edges for the die, polishing adds significant costs because every die (e.g., over 500 dies per wafer) must be polished individually. Another example includes etching a trench between the fabricated portions of the dies after which a mechanical saw cut is used to make a cut in the trench to cut through the remaining wafer. However, the distance from the edges of the fabricated portions of the die and the saw blade are not precisely controllable and may thus result in variable sized ledges of silicon wafer extending beyond the edge of the fabricated die. These ledges may restrict or interfere with a mode of an optical beam emitted from the edge of the fabricated die. The ledges may be polished down but, again, polishing each die becomes expensive. An additional example includes the use of precision dicing using a cutting laser. However, cutting lasers do not provide consistent cutting quality or ability for both silicon and fabricated die portions. Therefore, an etch may first be performed to generate a trench, but the same ledge issue arises because the cut through the silicon wafer cannot be precisely aligned with the optical quality edge.

Embodiments of the present disclosure address the issues of conventional die singulation methods by providing an etched trench on a frontside of the die and performing a mechanical cut from a backside of the die to overlap the etched trench. The frontside of the die may include the fabricated components of the die and thus the trench may be etched through the fabricated portions to the bulk silicon wafer. The trench may be etched through the fabricated portions and into the wafer. Accordingly, the mechanical backside cut may be depth controlled to cut through the silicon wafer to the trench but not into the fabricated die. Additionally, the width of the cutting blade may be wide enough to overlap the width of the etched trench such that an overhang of the fabricated die extends beyond the silicon wafer rather than a ledge of the wafer extending beyond the die. Thus, using the techniques described herein, an optical quality edge may be produced via the etched trench while the singulation of the die may be performed via the low cost method of mechanical cutting through the bulk silicon which does not require an optical quality edge. Additional details regarding the trench etching, the mechanical dicing, and their combination for separation of the dies of a wafer are described below with respect to FIGS. 3-7.

Although described throughout the present disclosure with respect to photonics dies of a LIDAR system, the techniques described herein may be used in conjunction with the manufacture and testing of any type of die or system and provides additional benefits to dies and systems that require die edges with optical quality (e.g., optical coupling).

FIG. 1 illustrates a LIDAR system 100 according to example implementations of the present disclosure. The LIDAR system 100 includes one or more of each of a number of components but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device May also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver May measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long-range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data that includes information about range and/or velocity points in the target environment as the optical scanner 102 scans additional points. The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
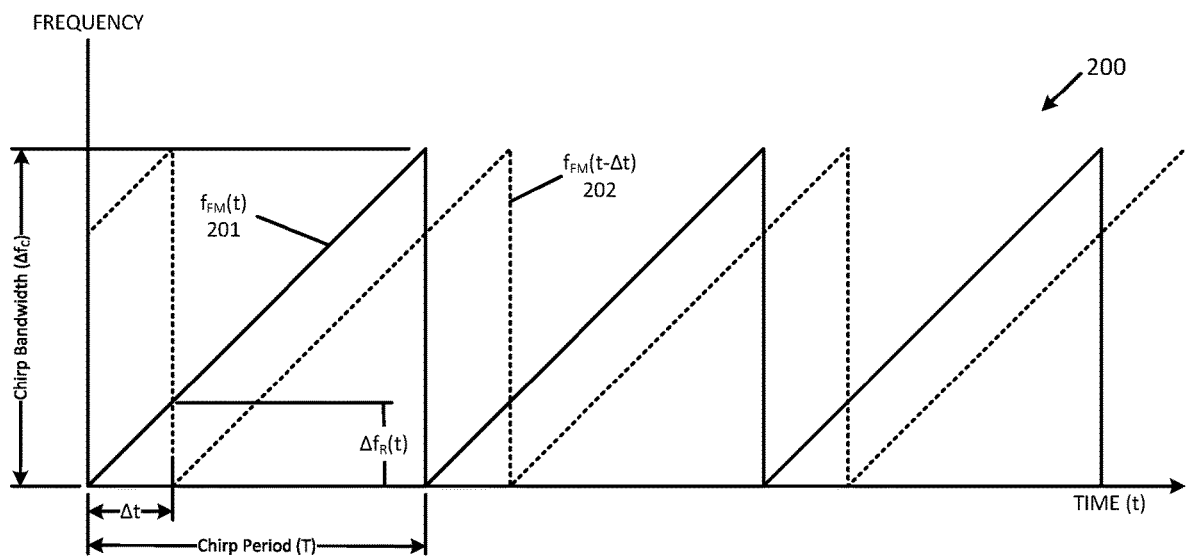
FIG. 2 is a time-frequency diagram illustrating one example of LIDAR waveforms according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta fc$ and a chirp period Tc. The slope of the sawtooth is given as $k=(\Delta fc/Tc)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c\,(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)\,(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
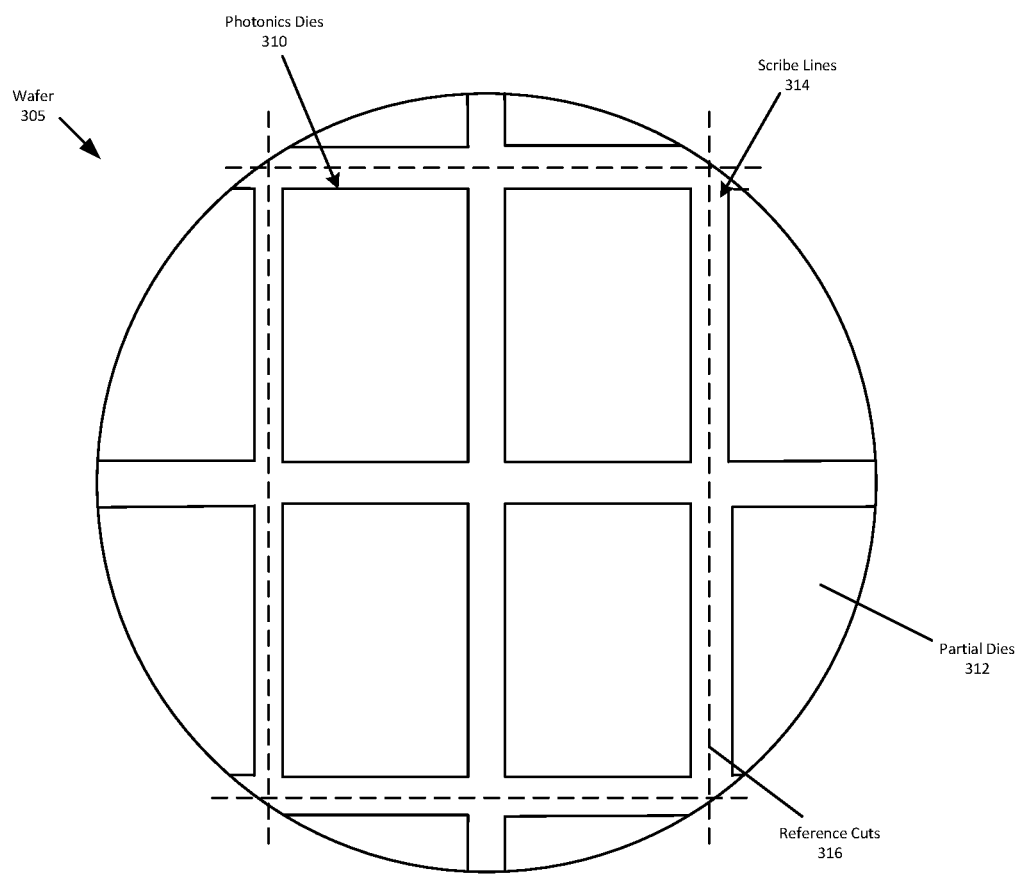
FIG. 3 is a block diagram illustrating an example wafer including dies constructed on a surface of the wafer.

FIG. 3 depicts a top view of a wafer 305 including a set of completed photonics dies 310 according to some embodiments. For simplicity of description, only four photonics dies are depicted on the wafer 305. It should be noted that the wafer 305 may include any number of photonics dies 310. For example, the wafer 305 may include as many photonics dies 310 that may fit on the wafer. The photonics dies 310 can include additional photonics components or electronic components, such as waveguides, optical sources, edge couplers, grating couplers, beam splitters, components to change polarization of an optical beam, optical detectors, or any other components depending on the design of the photonics dies. It should be noted that embodiments described herein can be used for singulating any photonics die or electronics die design from a wafer.

In some embodiments, singulating the photonics die includes applying an etching process to a front surface of the wafer 305 on which the photonics dies 310 are fabricated to create a trench between the photonics dies 310 along the scribe lines 314. After the etching is performed to create the trench, a dicing cut is performed from a rear surface of the wafer 305 to complete the singulation of the photonics dies 310. In particular, the trench etched on the front surface may extend, for example, 90 microns into the wafer which extends below and beyond the fabricated portion of the photonics dies 310 and into the bulk silicon wafer. The dicing cut performed from the backside of the wafer 305 may directly align with the etched trenches. Therefore, the depth of the blade performing the dicing cut may be precisely controlled to reach a depth into the backside of the wafer to reach the bottom of the etched trench without cutting through the fabricated portions of the photonics dies 310, as further described with respect to FIGS. 4A and 4B below.

In some embodiments, to perform the dicing cuts from the backside of the wafer 305, reference cuts 316 may be performed from the frontside of the wafer 305 along the scribe lines 314 along on one or more edges of the wafer 305. Once the reference cuts 316 are performed, the spacing and therefore the position and alignment of the scribe lines 314, and the corresponding etched trenches, may be known with respect to the reference cuts 316. Therefore, after the reference cuts 316 are performed, the wafer 305 can be flipped to perform the dicing cuts to complete the singulation of the photonics dies 310. The resulting singulated dies may then be incorporated into photonics systems such as a LIDAR apparatus or system.

In some embodiments, an infrared or other camera or detector may be used to view the structure of the fabricated photonics dies 310 from the backside of the wafer 305. Accordingly, in conjunction with the use of the infrared camera, the dicing cuts may be performed from the backside of the wafer 305 in alignment with the scribe lines 314 and the corresponding frontside etched trenches without performing the reference cuts 316.

Figure 4A:
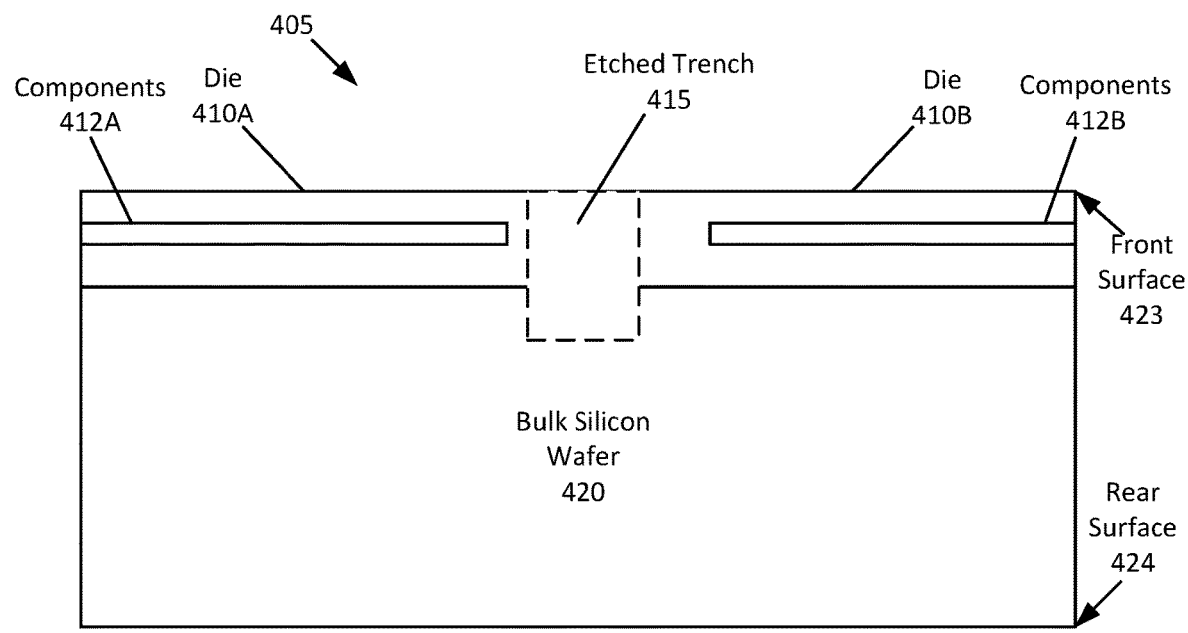
FIG. 4A illustrates an example etching in a process of separating dies on a silicon wafer.

FIG. 4A depicts a cross-sectional side view of a wafer 405 including an etched trench 415 on a frontside 423 of the wafer 405. As depicted, a trench 415 may be etched into the frontside 423 of the wafer through the fabricated material between dies 410A-B. As described above, dies 410A-B may be fabricated on bulk silicon wafer 420 along with many other dies. Accordingly, the depicted etched trench 415 may be performed and created between all the dies on the wafer 405. For example, an etching process may be performed on the entire front side 423 of the wafer to create the etched trench 415 between all the dies on the wafer. The etching process may be any etching process that generates an optical quality edge on the dies 410A-B. An optical quality edge may include an edge that is smooth with very few defects such that an optical beam can be edge coupled into and out of the edge with minimal signal loss. In some embodiments, the etching process may be an oxide etch that extends into the bulk silicon wafer 420.

Figure 4B:
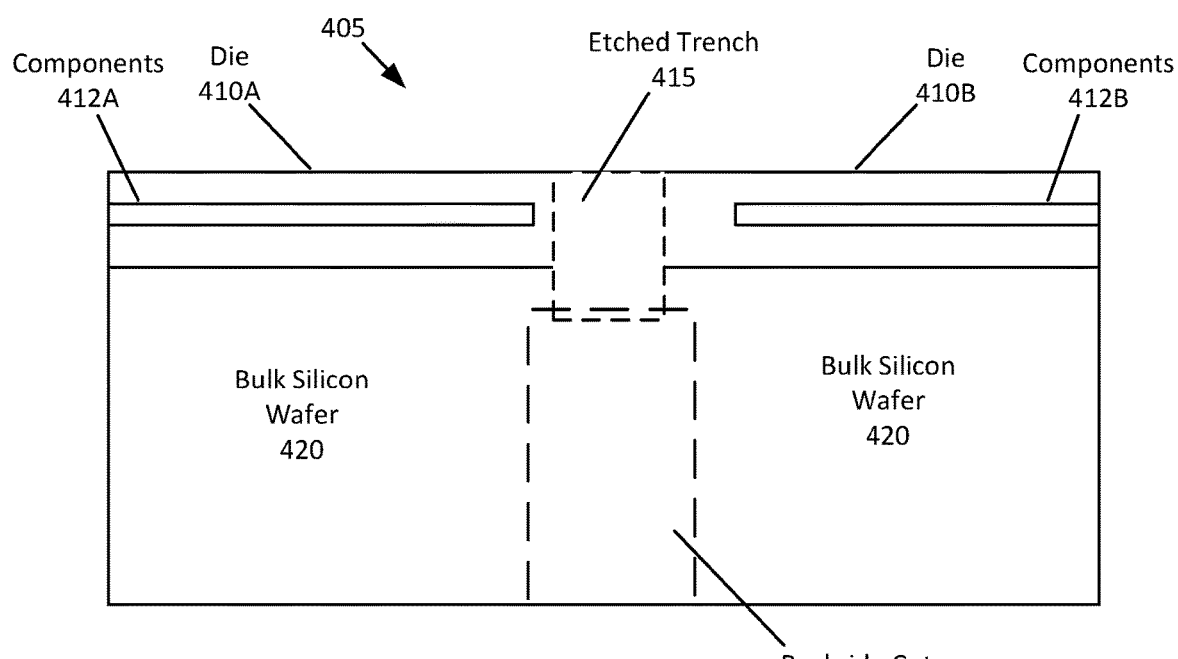
FIG. 4B illustrates an example backside cut in combination with a frontside etch in a process of separating dies on a silicon wafer.

FIG. 4B depicts another cross-sectional side view of a wafer 405 including an etched trench 415 on a frontside 423 of the wafer 405. As depicted, a backside cut 422 may be performed that is aligned with and extends into the etched trench 415. Accordingly, the backside cut 422 may completely cut through from the backside 424 of the wafer to the trench 415 to singulate the dies 410A-B. As can be seen from FIG. 4B, the width of the backside cut 422 may be wider than the etched trench 415 to ensure that a ledge of silicon extending beyond the edge of the dies 410A-B does not remain. In some embodiments, the width of the backside cut 422 may be between 100-150% of the width of the etched trench. Additionally, the depth of the backside cut 422 may extend into the etched trench 415 up to 50% or more of the depth of the etched trench 415. However, the depth control of the backside cut 422 may be controlled to prevent the backside cut 422 from extending into the fabricated portion of the dies 410A-B. Because the backside cut is a cheaper process than the frontside etch, the backside cut may extend nearly completely through the bulk wafer 420. Accordingly, the optical quality of the edges are produced and maintained while minimizing the costs to singulate the dies of the wafer.

Figure 4C:
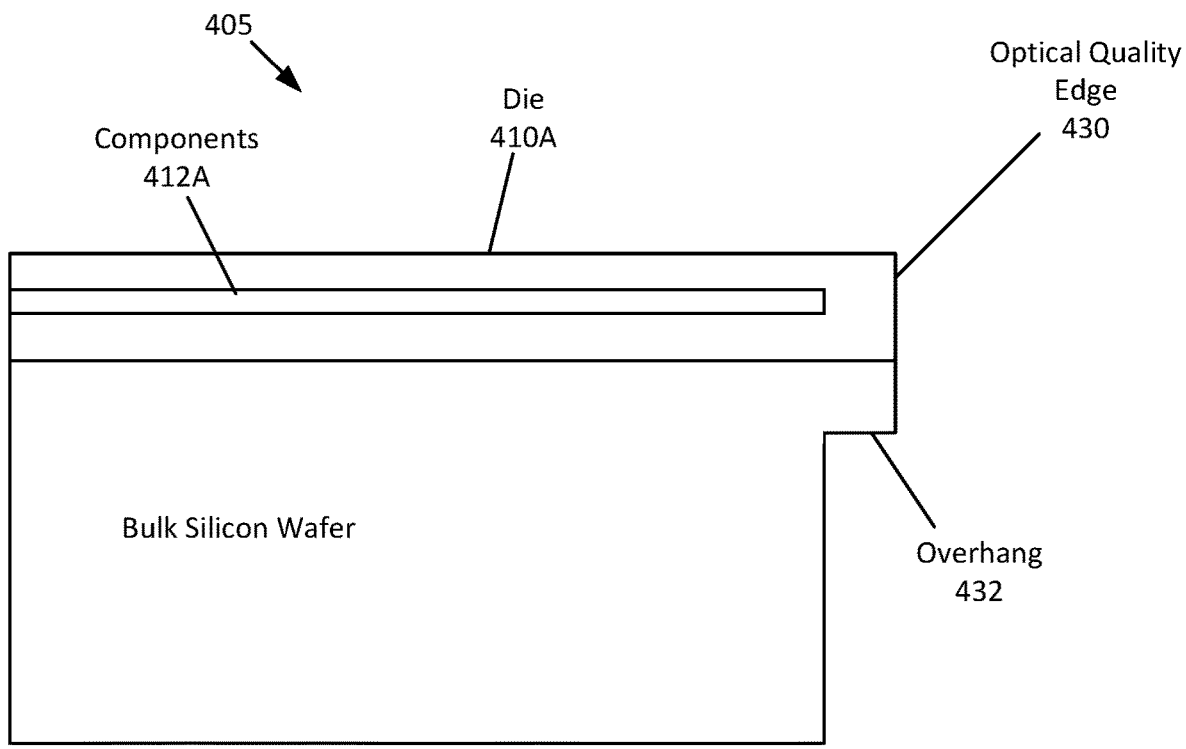
FIG. 4C depicts a cross-sectional side view of a singulated photonics die, according to embodiments of the present disclosure.

FIG. 4C depicts a cross-sectional side view of a resulting silicon photonics die from the singulation process provided in FIGS. 4A-B. As can be seen, the resulting photonics die 410A includes an optical quality edge 430 for edge coupling of an optical beam. Additionally, the die 410A further includes an overhang 432 of the bulk silicon wafer which ensures that a ledge of bulk silicon wafer does not extend beyond the optical quality edge 430. Thus, no interference with the optical signal is present from any bulk silicon beyond the optical quality edge 430. Additionally, the overhang 432 provides for predictability of abutting and arranging of various dies as there are no interferences between the optical quality edges 430 of the various dies singulated in the above manner.

It should be noted that the design and configuration of the optical components are simplified for ease of description. Furthermore, any design or structure of the dies 410A-B may be provided for singulation via the methods and systems described herein. For example, any type of electronic die, photonic die, or other form of die may be singulated as described herein.

Figure 5:
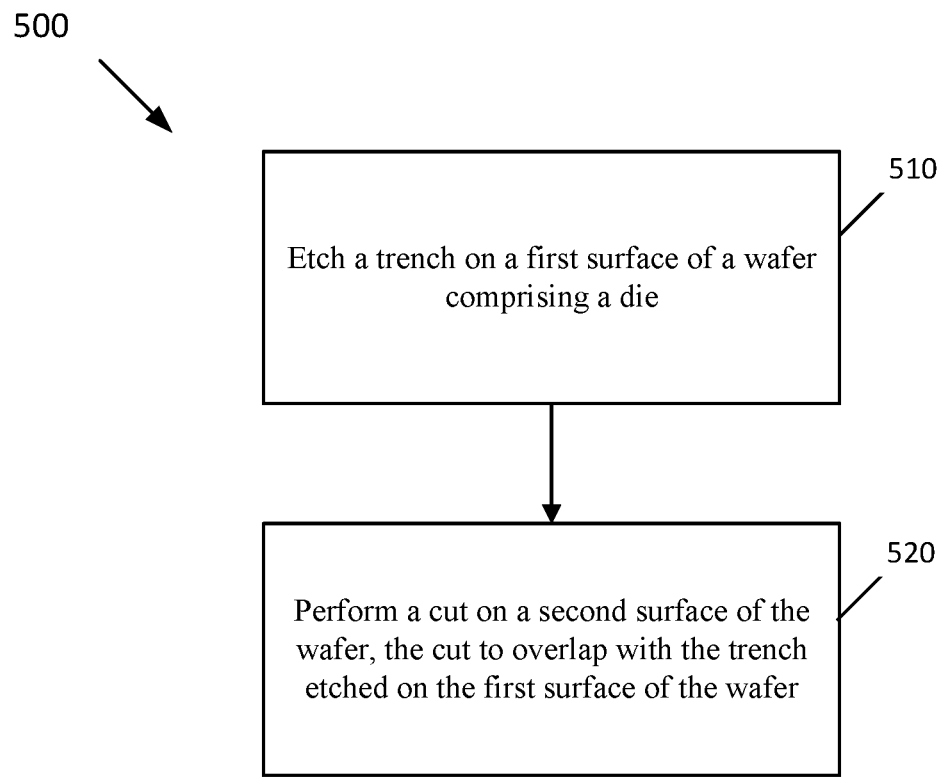
FIG. 5 is a flow diagram of a method of separating dies constructed on a wafer.

FIG. 5 is a flowchart illustrating a method 500 of separating dies constructed on a wafer.

Method 500 begins at block 510, where a trench is etched on a first surface of a wafer comprising a die. In some embodiments, the wafer includes a silicon wafer and the die is fabricated on the first surface of the wafer. The die may be fabricated using any known die fabrication techniques, such as printing, etching, etc. The trench may extend through the fabricated portions of the die into the bulk silicon wafer. For example, the fabricated portion of the die may be a small fraction of the height of the entire wafer while the rest of the height includes bulk silicon.

At block 520, a cut is performed on a second surface of the wafer, the cut to overlap with the trench etched on the first surface of the wafer. In some embodiments, the cut may be performed from the back or rear side of the wafer opposite the fabricated portions of the die. The cut may be depth controlled to overlap and intersect with the etched trench within the bulk silicon but not to reach the fabricated portions of the die. Therefore, the cut may result in a complete cut or void between dies of the wafer. Multiple such cuts may be used to fully singulate the die and any other dies fabricated on the silicon wafer substrate.

Figure 6:
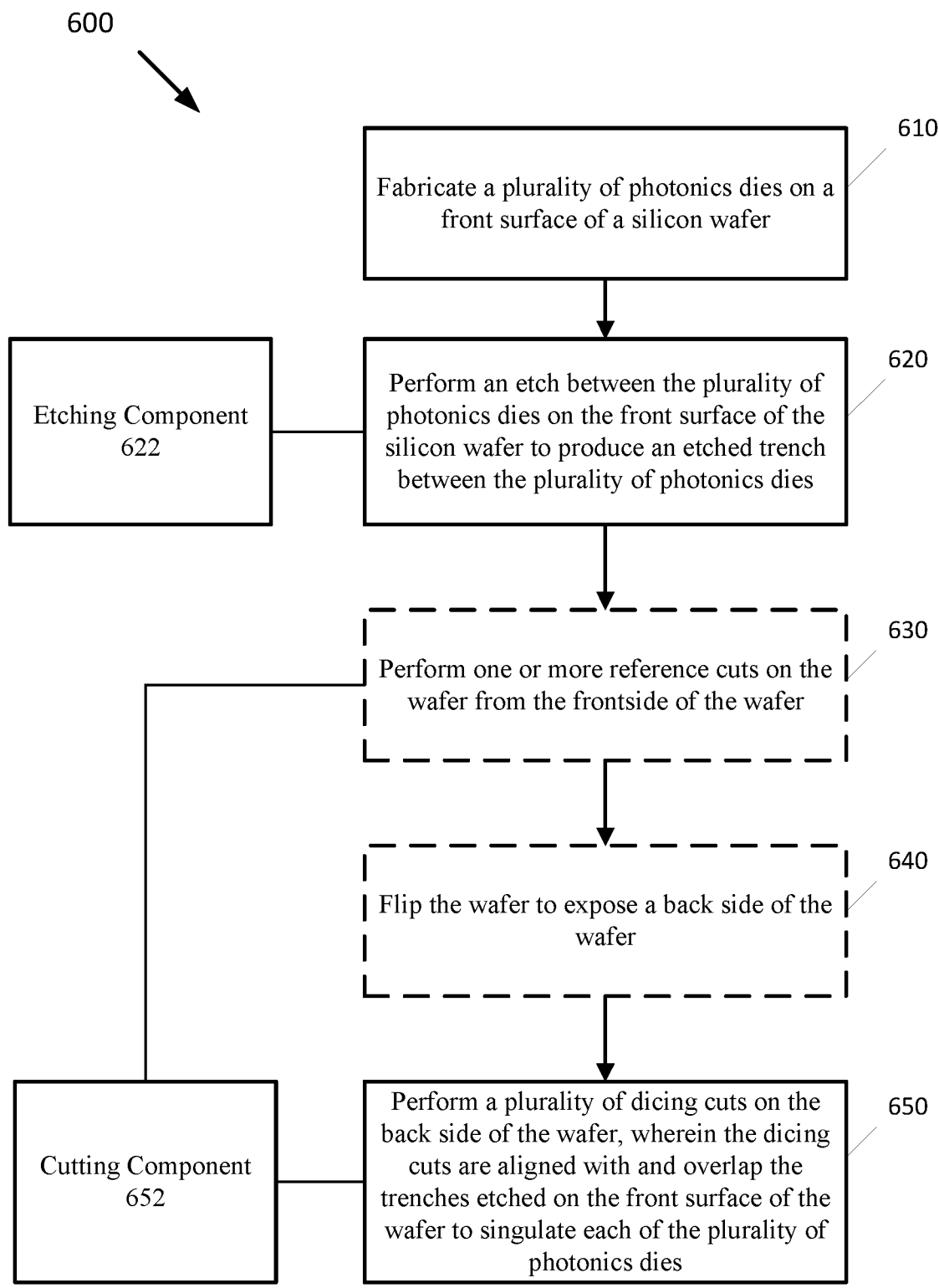
FIG. 6 is a flow diagram of a method of separating dies constructed on a wafer using a frontside etch and backside cut, according to some embodiments.

FIG. 6 is a flowchart illustrating a method 600 of performing die testing at the wafer level using a sacrificial waveguide, according to some embodiments.

Method 600 begins at block 610, where multiple photonics dies are fabricated on a front surface of a silicon wafer. For example, the photonics dies may be distributed in a uniform manner across a surface of the silicon wafer substrate. At this point, all the dies are together on the silicon wafer prior to being singulated.

At block 620, an etch is performed (e.g., by etching component 622) between the plurality of photonics dies on the front surface of the silicon wafer to produce an etched trench between the plurality of photonics dies. In some embodiments, the etch may be a deep oxide etch to create a deep trench through the fabricated portions between the dies and into the bulk substrate. Thus, a completely clean and optical quality edge results on each edge of the fabricated dies on the wafer due to the etch. In some embodiments, the etched trench may range from 50-120 microns in depth. However, a deeper etch may require the trench to also be wider, which may waste space and material of the wafer. Accordingly, the trench may be calibrated to extend just deep enough into the bulk silicon wafer to allow a cut from the back side to be performed to singulate the dies.

Optionally, at block 630, one or more reference cuts are performed (e.g., by cutting component 652) on the wafer from the front side of the wafer. The one or more reference cuts may be performed on the front side of the wafer using the provided alignment and sectioning of the fabricated photonics dies. For example, one reference cut may be performed on each edge of the wafer (e.g., four reference cuts, two along each alignment axis). Because the spacing of the photonics dies on the wafer is known, the reference cuts can be used from the backside of the wafer to calculate where each back side cut should be performed. For example, if the number of die between the reference cuts is known, then the space between parallel reference cuts can be divided by that number to calculate the spacing. Any other technique for utilizing the reference cuts to determine cut alignment may also be used. Optionally, at block 640, the wafer is flipped to expose a back side of the wafer. In some embodiments, an infrared or other imaging technology may be applied from the backside of the wafer to view the alignment of the photonics dies on the wafer. Accordingly, the reference cuts may not be performed when an imaging technology is used for cut alignment from the back side.

At block 650, a plurality of dicing cuts are performed (e.g., by cutting component 652) on the back side of the wafer, wherein the dicing cuts are aligned with and overlap the trenches etched on the front surface of the wafer to singulate each of the plurality of photonics dies. As described above, the dicing cuts may be aligned via the reference cuts made from the front side of the wafer or via an imaging technology to view the alignment of the die from the rear side of the wafer. The dicing cuts may be performed with a high precision saw blade that is wider than the etched trenches (e.g., by 30-50% wider than the trench). Accordingly, the alignment for the dicing cuts may have a tolerance to either side of the trench of 15-25% the width of the trench. Therefore, even if the blade and the cut are slightly misaligned, the effectiveness of the cut and the singulation technique to provide an optical quality edge with no bulk silicon ledge inference is maintained.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A photonics die, comprising:
 a first surface comprising fabricated components;
 a second surface comprising bulk silicon; and
 at least one edge comprising:
  a first portion generated from etching a trench from the first surface during singulation of the photonics die from a wafer, wherein a section of the photonics die remains between the fabricated components and the trench on the first surface; and
  a second portion generated from a mechanical dicing cut from the second surface, wherein during singulation the mechanical dicing cut overlaps with the trench on the first surface of the wafer to separate the die from the wafer.

2. The photonics die of claim 1, wherein the first portion of the at least one edge is generated from a deep oxide etch on the first surface of the wafer.

3. The photonics die of claim 1, wherein the mechanical dicing cut is performed on the second surface using a cutting blade.

4. The photonics die of claim 1, wherein the photonics die comprises edge emitting and edge receiving waveguides coupled with the first portion of the at least one edge of the photonics die.

5. The photonics die of claim 1, wherein the first portion of the at least one edge comprises an optical quality surface.

6. The photonics die of claim 1, wherein the first portion of the at least one edge extends beyond the fabricated components into bulk silicon wafer.

7. The photonics die of claim 1, wherein the mechanical dicing cut is wider than the trench etched from the first surface such that the first portion of the at least one edge overhangs the second portion of the at least one edge.

* * * * *